Sept. 24, 1963     C. R. BRANCH, JR     3,104,889
HAND TRUCK

Filed Feb. 28, 1962     2 Sheets-Sheet 1

Clarence R. Branch, Jr.
INVENTOR.

BY *Clarence A. O'Brien*
*and Harvey B. Jackson*
Attorneys

Sept. 24, 1963  C. R. BRANCH, JR  3,104,889
HAND TRUCK
Filed Feb. 28, 1962  2 Sheets-Sheet 2
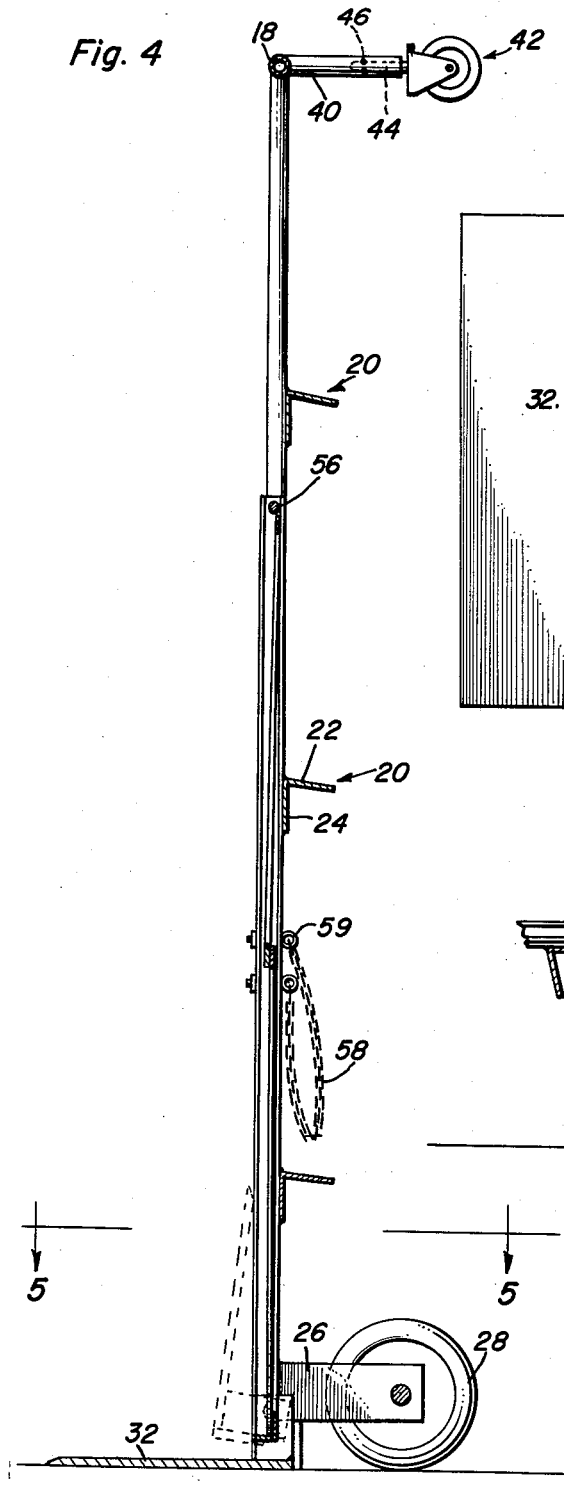
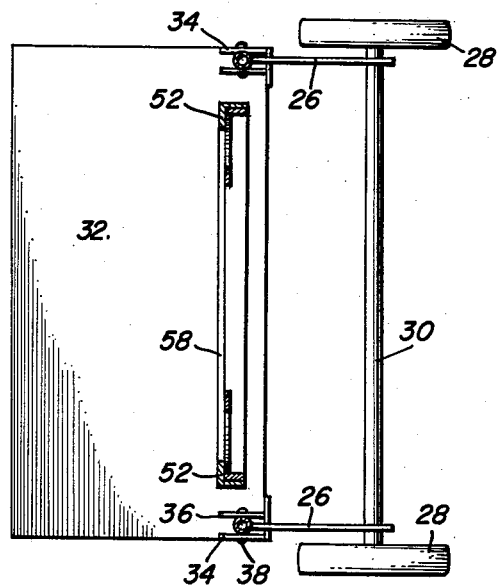
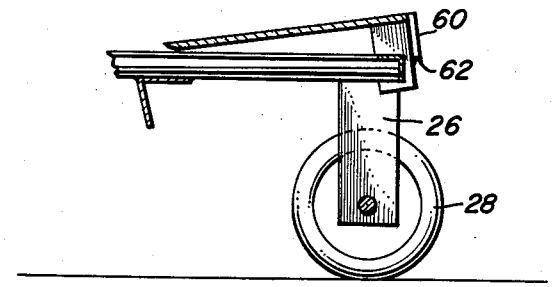
Clarence R. Branch, Jr.
INVENTOR.

United States Patent Office 3,104,889
Patented Sept. 24, 1963

3,104,889
HAND TRUCK
Clarence R. Branch, Jr., 365 S. Burnet St.,
East Orange, N.J.
Filed Feb. 28, 1962, Ser. No. 176,336
4 Claims. (Cl. 280—30)

This invention relates to convertible vehicles, and particularly to a hand truck which can be converted into a dolly or a stepladder and may be folded into a compact package for easy storage.

Accordingly, it is a primary object of this invention to provide a hand truck which is convertible into a stepladder, a dolly, or may be folded into a compact package for storage.

It is another object of the invention to provide a hand truck which may be converted into a stepladder and when used as a ladder the wheels thereof are elevated above the supporting surface for the ladder so that it cannot move or slip.

It is another object of the invention to provide a convertible hand truck which has a pivoted nose plate which normally extends at 90° to the body of the hand truck but which may be tilted for supporting the hand truck when it is used as a ladder or may be folded substantially parallel to the body for compact storage.

It is another object of the invention to provide a hand truck which may be used as a dolly and the dolly wheel is spaced a substantial distance from the truck wheels for greater stability and the dolly wheel is removable when not needed.

It is another object of the invention to provide a convertible hand truck which is economical to manufacture and maintain, is of light weight, and is durable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged vertical cross-sectional view taken substantially on the plane of line 4—4 in FIGURE 2;

FIGURE 5 is a cross-sectional view taken substantially on the plane of line 5—5 of FIGURE 4; and FIGURE 6 is a view similar to FIGURE 4 showing one end of the hand truck when it is in a horizontal position.

Figure 1:
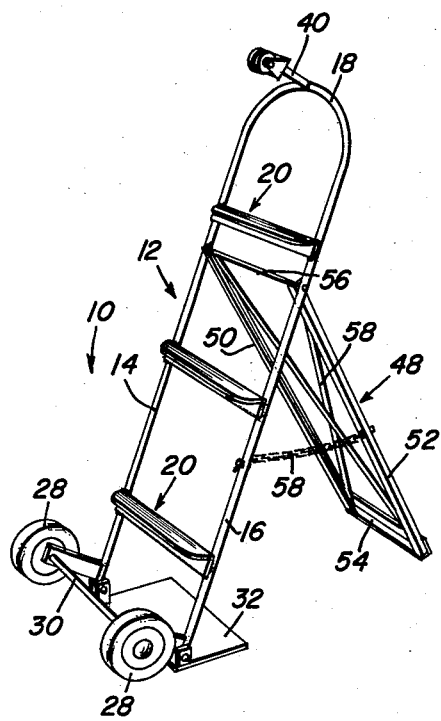
FIGURE 1 is a perspective view of the hand truck illustrating its use as a stepladder.

As shown in the drawings, the hand truck 10 comprises a U-shaped frame 12 of tubular construction including spaced parallel sides 14 and 16 integrally connected by a semi-circular bight portion 18. The bight portion 18 normally serves as a handle when the invention is used as a hand truck.

The sides 14 and 16 are rigidly connected by spaced parallel angle members 20 extending therebetween and welded thereto. Each angle member 20 is composed of two flat plates 22 and 24 integrally connected together at their edges and forming an acute angle therebetween of approximately 70°. Plate 24 is welded to the sides 14 and 16 and the plate 22 functions as a step when the hand truck is used as a ladder. The steps 22 have rounded outer corners.

A pair of parallel plates 26 are secured to the free ends of sides 14 and 16 and form a substantially 90° angle therewith. Both the steps 22 and plates 26 normally project downwardly below the underside of the frame 12. The plates 26 function as supporting legs for the main wheels 28 which are rotatably connected to the legs by means of a horizontal axle 30 which extends through the lower ends of the legs and has the wheels 28 journalled on its ends.

A nose plate 32 of rectangular configuration is pivotally connected to the free ends of sides 14 and 16. Two opposite corners of the nose plate are each provided with a pair of parallel spaced lugs 34 and 36 which receive the free end of one of the sides therebetween. A cylindrical rivet 38 extends through aligned apertures in the lugs and sides so as to pivotally connect them together.

A tubular arm 40 is secured to the center of the plate portion 18 and projects substantially parallel to the legs 26. A conventional caster wheel assembly 42 is pivotally connected to the arm 40 by means of a cylindrical shaft 44 which is journaled within the tubular arm 40 and normally secured thereto by detent means 46. The detent means 46 may comprise a conventional spring urged ball in arm 40 engaging an arcuate socket in the shaft 44, and permits the arm and caster wheel assembly to be manually connected or disconnected at will.

A rectangular ladder support or prop 48 is pivotally connected to the frame 12 and comprises parallel legs 50 and 52 connected at their ends by an angle member 54 and a tubular rod 56. The support 48 is braced by an X-frame 58. The ends of rod 56 extend through bores in sides 14 and 16 so as to pivotally connect the ladder support to the frame. A chain 58 is connected between the central portions of frame 12 and support 48 so as to limit angular separation therebetween to substantially 45°.

Figure 2:
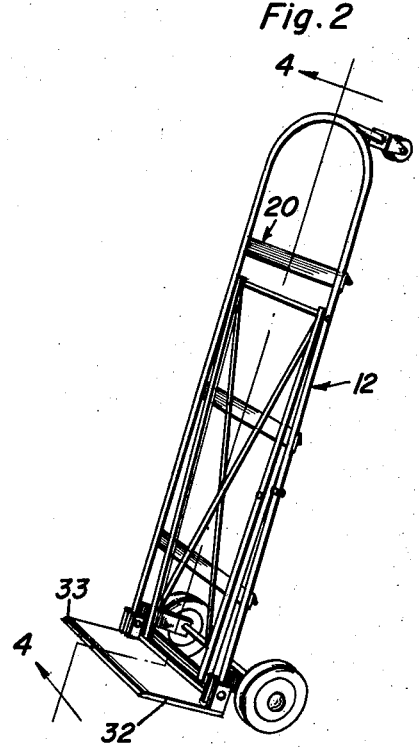
FIGURE 2 is a perspective view similar to FIGURE 1 but showing the invention used as a hand truck.

FIGURE 2 illustrates the invention when used as a hand truck. When used as a hand truck, the nose plate 32 is pivoted down away from frame 12 until substantially normal thereto. The bottom side edges of each of the pair of lugs 34 and 36 are connected together by a stop member or plate 60 welded thereto. When nose plate 32 is normal to frame 12, edge 62 of each stop plate 60 contacts an edge of one of the legs 26 so as to positively prevent further pivotal movement of the nose plate. Ladder support 48 is pivoted parallel and substantially coplanar with the frame 12 whereupon it is maintained by gravity and friction in supporting engagement against the plates 24. Caster wheel assembly 42 may be removed manually if desired. When the invention is used as a hand truck, the ladder support 48 substantially closes the openings between sides 14 and 16 and angle members 20 so as to prevent loads carried on the nose plate 32 from passing between the angle members 20.

Figure 3:
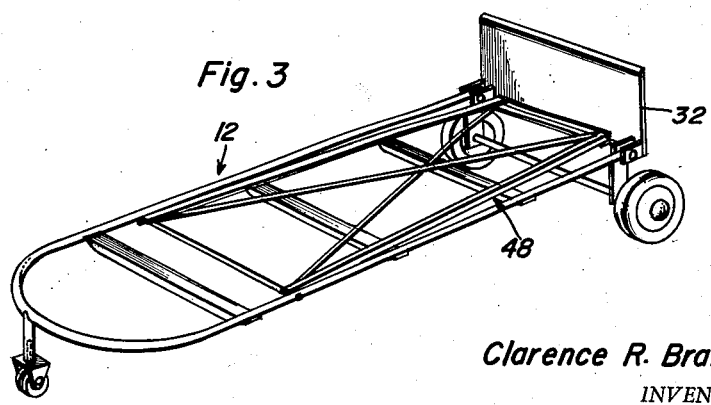
FIGURE 3 is a perspective view illustrating the invention for use as a dolly.

To use the invention as a dolly as illustrated in FIGURE 3, it is only necessary to tilt frame 12 to a horizontal position whereby it is supported on all three wheels 28 and 42. The nose plate 32 may be folded to a horizontal position if desired.

When using the invention for a stepladder as illustrated in FIGURE 1, the ladder support 48 is pivoted outwardly from frame 12 until stopped by chain 58. As shown in FIGURE 4, chain 58 is connected to the frame and support by eye-bolt and nut assemblies 59. The lower end of the frame is supported on nose plate 32 which pivots toward the frame to a horizontal position parallel to the supporting surface therefor. The wheels 28 are elevated above the supporting surface thereby preventing the ladder from rolling or slipping in relation thereto.

Preferably, the dolly structure is composed of cold rolled steel. The nose plate 32 is preferably provided with a sharp or rounded leading edge 33 to permit it to be wedged under loads.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hand truck and stepladder comprising, in combination, a generally U-shaped frame, a pair of legs mounted on the end portions of said frame, a transverse axle mounted on said legs, supporting wheels on the end portions of the axle, a nose plate, pairs of spaced lugs on the plate straddling said end portions of the frame and pivotally connected thereto for mounting said plate thereon for swinging movement to an inoperative position paralleling the frame or to an operative position at an angle relatively to the frame, and members bridging the pairs of lugs and engageable with the legs for positively preventing swinging movement of said nose plate beyond said operative position, said plate being engageable with a supporting surface for mounting the frame thereon for vertical swinging movement to an inclined position across the plate to function as a stepladder, and means for supporting the frame in said inclined position.

2. The combination of claim 1, said means including a prop pivotally mounted on the frame and engageable with said supporting surface when in an operative position, said prop, when in an inoperative position, paralleling the frame, said plate, when in an inoperative position, overlying the free end portion of the prop in its inoperative position.

3. The combination of claim 2, together with transverse bars of angular cross-section mounted at spaced points on the frame and providing steps for the stepladder.

4. The combination of claim 3, and a caster wheel mounted on the bight portion of the frame for movably supporting said frame horizontally on the supporting surface in conjunction with the wheels.

References Cited in the file of this patent

UNITED STATES PATENTS

| | | |
|---|---|---|
| 310,836 | Lowen | Jan. 13, 1885 |
| 466,899 | Bourell | Jan. 12, 1892 |
| 1,116,779 | Witt | Nov. 10, 1914 |
| 2,329,439 | Henssen | Sept. 14, 1943 |
| 3,043,603 | Major | July 10, 1962 |

FOREIGN PATENTS

| | | |
|---|---|---|
| 574,071 | Great Britain | Dec. 19, 1945 |
| 753,922 | Great Britain | Aug. 1, 1956 |